United States Patent
Vikramaditya et al.

(10) Patent No.: US 9,336,807 B1
(45) Date of Patent: May 10, 2016

(54) UNSTABLE READER DETECTION

(71) Applicant: Seagate Technology LLC, Cupertino, CA (US)

(72) Inventors: Barmeshwar Vikramaditya, Eden Prairie, MN (US); Patrick Korkowski, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/698,587

(22) Filed: Apr. 28, 2015

(51) Int. Cl.
  *G11B 21/02* (2006.01)
  *G11B 5/596* (2006.01)
  *G11B 5/60* (2006.01)
  *G11B 20/18* (2006.01)

(52) U.S. Cl.
  CPC ............ *G11B 5/6029* (2013.01); *G11B 20/182* (2013.01)

(58) Field of Classification Search
  CPC .... G11B 5/6005; G11B 5/59633; G11B 5/54; G11B 27/36; G11B 5/012; G11B 27/3027; G11B 2220/90
  USPC .................. 360/31, 48, 75, 55, 53, 51, 77.06
  See application file for complete search history.

(56) References Cited

U.S. PATENT DOCUMENTS

| | | | |
|---|---|---|---|
| 6,777,929 B2 | 8/2004 | Fang et al. | |
| 7,330,327 B1* | 2/2008 | Chue | G11B 5/59633 360/51 |
| 7,564,236 B1 | 7/2009 | Call et al. | |
| 8,035,921 B2 | 10/2011 | Sunwoo | |
| 8,289,644 B2 | 10/2012 | Holmberg | |
| 8,773,802 B1* | 7/2014 | Anderson | G11B 5/6029 360/55 |
| 2008/0049351 A1 | 2/2008 | Yamanaka et al. | |
| 2009/0296270 A1 | 12/2009 | Jin et al. | |
| 2013/0294210 A1 | 11/2013 | Taratorin | |
| 2014/0177089 A1 | 6/2014 | Hur et al. | |

* cited by examiner

*Primary Examiner* — Nabil Hindi
(74) *Attorney, Agent, or Firm* — Hall Estill Attorneys at Law

(57) ABSTRACT

Method and apparatus for detecting unstable read sensors (readers) for data storage systems. In some embodiments, a transducer is supported adjacent a rotating data recording medium having servo data patterns interspersed with calibration test data patterns. A read sensor of the transducer reads the servo and calibration test data patterns while the transducer is maintained at a passive fly height adjacent the medium. A corresponding location on the medium is identified for an error detected during the reading of the servo and calibration test patterns. The servo and calibration test patterns at the location are reread using the read sensor to characterize the read sensor as an unstable reader.

20 Claims, 6 Drawing Sheets

0 0 0
GRAY CODE
(LSBs)

SERVO BURSTS

UNSTABLE READER DETECTION

SUMMARY

Various embodiments of the present disclosure are generally directed to a detection methodology to detect unstable read sensors (readers) for data storage systems, such as but not limited to magneto-resistive (MR) read sensors in a hard disc drive (HDD).

In some embodiments, a transducer is supported adjacent a rotating data recording medium having servo data patterns interspersed with calibration test data patterns. A read sensor of the transducer reads the servo and calibration test data patterns while the transducer is maintained at a passive fly height adjacent the medium. A corresponding location on the medium is identified at which an error is detected during the reading of the servo and calibration test patterns. The servo and calibration test patterns at the location are reread using the read sensor to characterize the read sensor as an unstable reader.

In other embodiments, an apparatus includes a rotatable data recording medium having servo data patterns interspersed with calibration test data patterns. A transducer is supported adjacent the medium, the transducer having a read sensor and a fly height adjustment (FHA) mechanism. A data channel processes readback signals from the read sensor as the read sensor reads the servo data patterns and calibration test data patterns at a passive fly height during which the FHA mechanism is in a deactivated state. A control circuit directs the transducer to reread a location on the medium associated with an error condition in the processed readback signals a plural number of times in succession to characterize the error condition as due to instability in the response of the read sensor.

In other embodiments, an electrical test (ET) system has a rotatable data recording medium with servo data patterns interspersed with calibration test data patterns. A plurality of nominally identical transducers are each mounted adjacent the medium and each have a read sensor and a fly height adjustment (FHA) mechanism. A corresponding plurality of data channel circuits are coupled to the transducers with each adapted to concurrently process readback signals from the associated read sensor of the associated transducer as the read sensor reads selected servo data patterns and calibration test data patterns from the medium and the associated transducer is supported at a passive fly height during which the FHA mechanism of the associated transducer is in a deactivated state. A controller is operative to collect error rate data during an initial scan from each of the transducers. The controller is further operative to, for each location on the medium associated with an error condition determined from the error rate data, direct the associated transducer to reread the associated location on the medium a plurality of times and to characterize the associated transducer as an unstable reader responsive to the rereading of the associated location.

These and other features and aspects which characterize various embodiments of the present disclosure can be understood in view of the following detailed discussion and the accompanying drawings.

DETAILED DESCRIPTION

Figure 1:
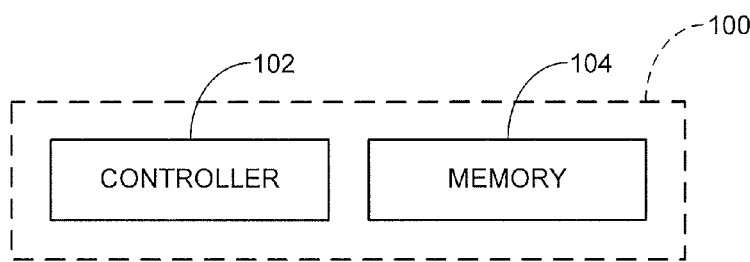
FIG. 1 is a functional representation of a data storage device in accordance with various embodiments of the present disclosure.

The present disclosure generally relates to data storage, and more particularly to an apparatus and method for detecting unstable read sensors (readers), such as but not limited to magneto-resistive (MR) read sensors adapted for use in hard disc drives (HDDs).

Data storage devices are electronic devices configured to store and retrieve data in a memory. One popular form of data storage device is a hard disc drive (HDD) which uses one or more rotatable magnetic recording media (discs) that are accessed by a corresponding array of moveable data read/write heads (transducers). The transducers are controllably moved to tracks defined on data recording surfaces of the media, and may be hydrodynamically supported in close proximity to the data recording surfaces using fluidic (e.g., air) currents established by high speed rotation of the media.

Transducers often include separate write and read elements to write data to, and read data from, the tracks. The write elements may take the form of perpendicular recording magnetic coils that apply time-varying, bi-directional magnetic write fields to write data to a recording layer of the media. The read elements (also referred to as "read sensors" and "readers") may take the form of magneto-resistive (MR) sensors configured to sense a previously written magnetic pattern responsive to changes in electrical resistance of the sensors induced by the magnetic pattern. Other forms of write elements and read sensors can be used.

Transducers can include multiple write elements and/or multiple read sensors to support multi-dimensional recording and other complex data recording techniques. Transducers can include other operative elements as well. Thermal assist modules such as heat assisted magnetic recording (HAMR) or microwave assisted magnetic recording (MAMR) devices include a source of electromagnetic energy (e.g., a laser diode, an oscillator, etc.) to provide localized heating of the media to temporarily lower the magnetic coercivity of the media during a write operation. Fly height adjustment (FHA) modules may include thermal heaters or other mechanisms that controllably adjust the fly height (clearance distance) between the transducer and the data recording surface through thermal expansion of a slider body used to support the read and write elements. Proximity and/or contact sensors can be used to sense contact between the transducer and the data recording surface. Optical sensors can be used to sense an applied power level of the thermal assist mechanism, and so on.

Reader instability is a phenomenon that can affect certain types of read sensors during operation. Generally, reader instability is exhibited as a relatively short duration, transitory change in the output response transfer function performance of the reader, leading to a significant degradation of bit error rate or other channel quality measurement. Reader instability is often manifested as a significant reduction in the signal to noise ratio (SNR) performance of the reader.

It has been found that reader instability is usually not a steady-state event, but often occurs on an infrequent and unpredictable basis. While the causes of reader instability are not always fully understood, manufacturing defects have been found to be a contributing factor. It is desirable to identify and screen out transducers with latent reader instability characteristics early in the data storage device manufacturing process, such as prior to installation of the transducers into manufactured devices and prior to shipment of the manufactured devices to an end user environment. Nevertheless, because of the transitory and unpredictable nature of reader instability, there has not been an effective and reliable mechanism that can repeatedly detect readers prone to instability.

Various embodiments of the present disclosure are accordingly directed to an apparatus and method for identifying and processing unstable readers. As explained below, some embodiments generally include hydrodynamically supporting a read transducer adjacent a rotating data recording medium surface. The surface has a series of concentric tracks formed from spaced apart servo data patterns interspersed with time varying calibration data patterns. A read sensor of the transducer is used to output a readback signal from the servo and calibration data patterns while maintaining the transducer at a passive (e.g., non-heater adjusted) fly height above the surface.

Upon detection of an error condition in the readback signal associated with a particular error location, the read sensor is directed to perform additional scans over the error location. Such scans can include performing a cross-track scan and rereading the error location a statistically significant number of times to identify the error condition as a reader instability condition. In some cases, a plot of multiple scans can be displayed along with an ideal waveform to assist in the analysis. In other cases, internal computer based analysis of multiple scans in conjunction with an ideal waveform response can be performed.

Corrective actions are thereafter taken such as rejecting the unstable reader from further manufacturing processing, performing failure analysis steps to identify and correct the reader instability condition in other readers, etc. While some embodiments perform the instability detection at a manufacturing component level, other embodiments perform, the instability detection at the assembled storage device level, such as during device manufacturing or during subsequent field use of the device in an end user environment.

These and other features of various embodiments disclosed herein can be understood beginning with a review of FIG. 1 which provides a functional block representation of an exemplary data storage device 100. The device 100 includes a controller 102 and a memory 104. The controller 102 can take a variety of forms such as a hardware based control circuit or a general purpose programmable processor having suitable programming to provide top level control for the device. The memory 104 can also take a variety of forms and is generally used to store user data from a host device (not separately shown) coupled to the storage device 100.

Figure 2:
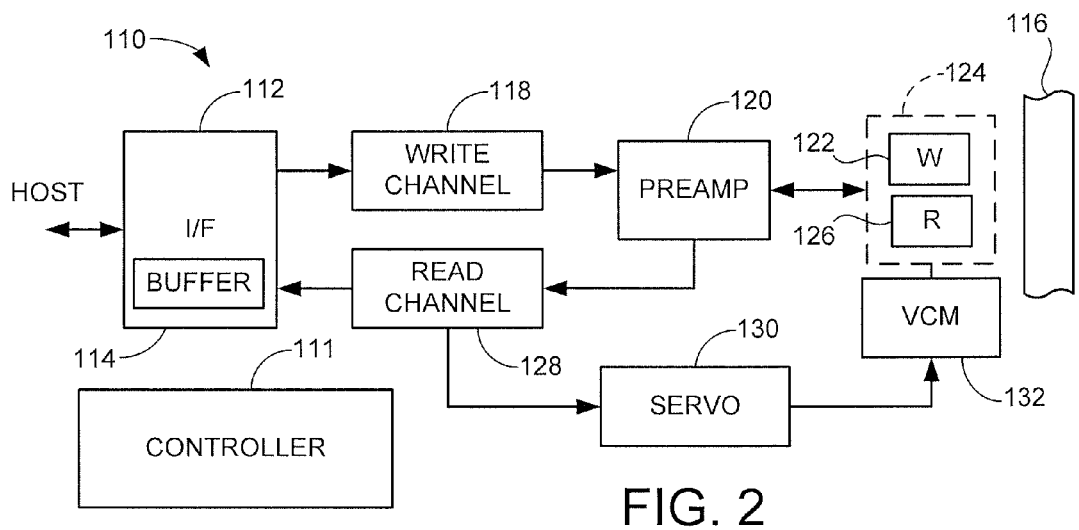
FIG. 2 is a functional representation of another data storage device corresponding to the device of FIG. 1.

FIG. 2 is a functional block diagram for a data storage device 110 that corresponds to the device 100 of FIG. 1 in accordance with some embodiments. The data storage device 110 is characterized for purposes of the present disclosure as a hard disc drive (HDD) that employs perpendicular magnetic recording to store data from a host device (not separately shown). Such is merely exemplary and is not limiting.

The device 110 in FIG. 2 includes a top level controller 111 that may be realized in hardware or firmware. A system on chip (SOC) configuration may be used with an application specific integrated circuit (ASIC) having a programmable processing core and programming instructions stored in an associated memory.

An interface circuit (I/F) 112 operates under the control of the controller 111 to communicate with the host device. The I/F 112 and includes a data buffer 114 to temporarily store data pending transfer between the host device and a rotatable perpendicular data recording medium 116.

A write channel 118 operates to encode input write data from the host to provide a serialized data stream to a preamplifier/driver (preamp) 120. The preamp 120 includes write driver and read preamplification circuits to enable the preamp to provide a sequence of write currents to a perpendicular magnetic write element (W) 122 of a data transducer 124 to write data to the medium 116, and to amplify and condition readback signals transduced from the medium by a magnetoresistive (MR) read sensor (R) 126 of the data transducer 124. The processed readback signals are provided to a read channel 128, which applies signal processing techniques to recover the originally stored data to the buffer 114 pending subsequent transfer to the host.

During both read and write operations, servo positioning data provided to the medium 116 are transduced by the read element 126 and, after demodulation by a portion of the read channel 128, are supplied to a servo control circuit 130. The servo control circuit 130 provides positional control signals to a voice coil motor (VCM) 132 coupled to the data transducer 124 to position the respective write and read elements 122, 126 adjacent various data tracks defined on the medium 116. Although not shown, other actuator configurations are envisioned including multi-stage microactuator based solutions.

Figure 3:
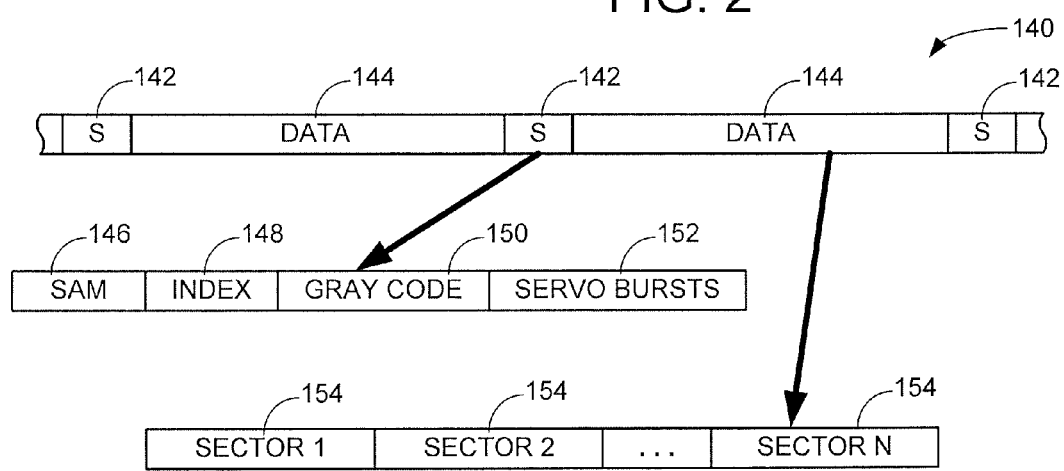
FIG. 3 depicts an exemplary format for data tracks from FIG. 2.

FIG. 3 depicts an exemplary data track 140 on the storage medium 116. An embedded servo arrangement employs spaced-apart servo (S) fields 142 arrayed around the circumference of the medium 116. Data fields 144 are provided along the tracks between adjacent pairs of the servo fields 142.

Each servo field 142 includes a number of subfields such as a servo address mark (SAM) field 146, an index field 148, Gray code field 150 and servo burst field 152. The SAM field 146 provides synchronization pattern and timing information to adapt the read channel 128 to recover the remaining servo information. The index field 148 stores index information to indicate the angular location of the servo field 142 with respect to the medium 116. The Gray code field 150 stores Gray code (track address) information to indicate the radial location of the servo field, and the servo burst field 152 provides servo bursts (e.g., ABCD bursts in a quadrature pattern) for intra-track positional control. Other servo field arrangements and contents can be provided as desired, so the example configuration of FIG. 3 is merely exemplary and not limiting.

The data fields 144 store a number of data sectors (blocks) 154. Each data sector 154 is configured to store a selected amount of data, such as user data, control data, programming data for the controller 111, special test patterns including random bits or oscillating repeating patterns, etc. For clarity herein, these and other types of data are collectively referred to as "calibration" test pattern data.

Figure 4:
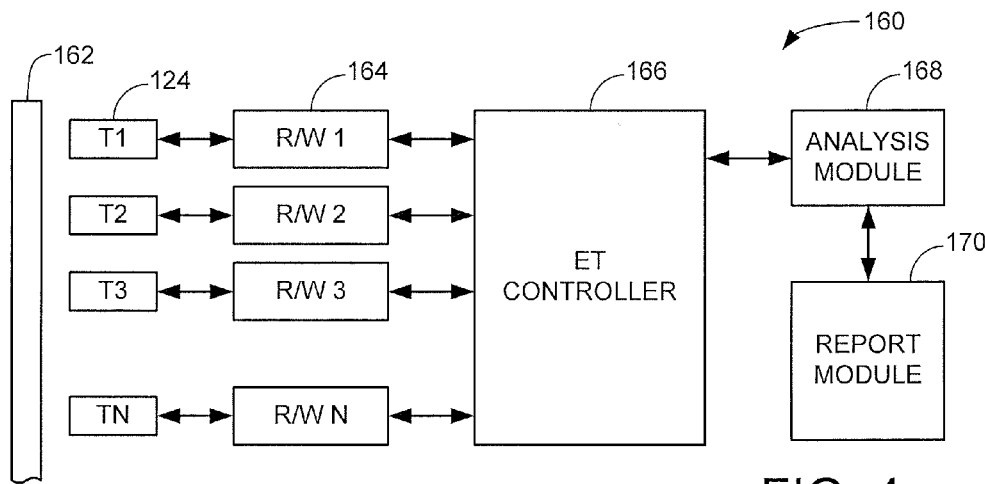
FIG. 4 is a functional representation of an electrical test (ET) system used to detect unstable readers in accordance with some embodiments.

FIG. 4 is a functional block diagram of an electrical test (ET) system 160 constructed and operated in accordance with various embodiments. It will be understood that the system 160 can be a spin-stand based module operative to carry out component-level testing on various components prior to installation of the components into the storage device 110. In one case, head gimbal assemblies (HGAs) including the various transducers 124 are tested. It will be appreciated that an HGA may include a slider supporting the various operative elements of the transducer, a gimbal assembly, a load arm assembly, a microactuator, signal paths (e.g., flex on suspension, or FOS), etc.

While a variety of test functions are carried out by the system 160, of particular interest is a reader instability operation which operates, as explained below, to induce reader instability in the transducers 124 susceptible to the same to allow manufacturing screening operations on unstable readers.

The system 160 in FIG. 4 includes a plurality of the transducers 124 (identified as transducers T1 to TN) which are mounted adjacent one another proximate a data recording medium 162. Any number of transducers can be concurrently tested as desired. The data recording medium 162 may be formatted with a plurality of tracks such as 140 in FIG. 3, including servo fields 142 and data fields 144. In some cases, the calibration data are arranged as special repetitive patterns, such as 2T patterns, which are written to the various data sectors 152. In other cases, the calibration data comprise random data patterns to simulate user data or other types of information in the data fields 144.

Each of the transducers 124 is connected to a corresponding read/write (R/W) channel 164 (identified as R/W 1 to N). The R/W channels 164 communicate with an electrical test (ET) controller 166, which provides top level control of the testing process. An analysis module 168 performs certain analysis functions discussed below. A report module 170 provides a user interface (I/F) such as a monitor, view screen or other interface to allow test personnel to control the test process and to evaluate the results of the analysis module 170 as required.

Because of the controlled environmental requirements for operation of the transducers, the entire system 160 or portions thereof may be disposed within a clean room or other controlled environment. Alternatively, the transducers 124 (e.g., HGAs) and the medium 162 may be placed in an environmentally controlled enclosure or other environment to facilitate operation, and remaining portions of the system may be disposed outside the enclosure.

While it is contemplated that the transducers will operate in the same types of environmental conditions as will generally be experienced after subsequent installation into the data storage devices (e.g., 110 in FIG. 2), such as an air environment, an inert gas environment, a specified temperature range, specified relative humidity conditions, etc., in some cases the test environment may be altered in an effort to enhance the efficiency of the testing process. For example, empirical analysis may determine that certain types of environmental conditions may tend to enhance the detection of latent instability. In such case, the system may be configured to introduce such conditions during the instability portion of the test.

Figure 5:
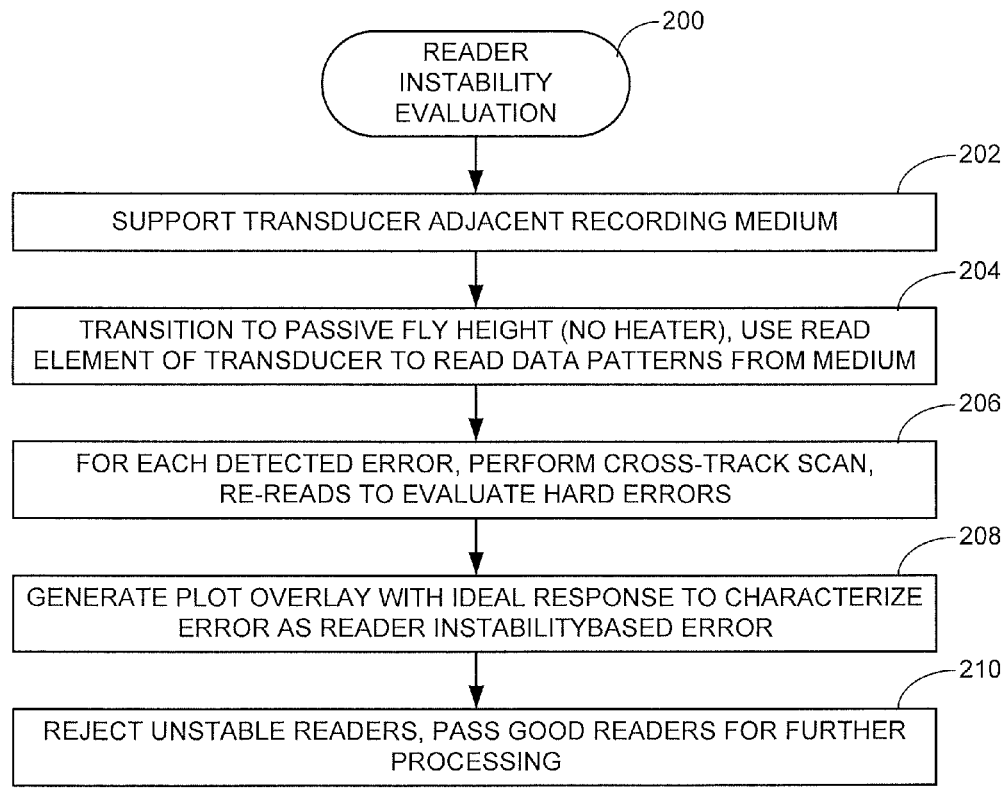
FIG. 5 is a flow chart for a reader instability evaluation routine illustrative of steps carried out by the system of FIG. 4.

FIG. 5 provides a flow chart for a reader instability evaluation routine 200 carried out by the system 160 of FIG. 4 in accordance with various embodiments. As noted above, the reader instability evaluation may be part of a larger test cycle for the transducers (units under test).

Generally, the reader instability routine operates as an error rate test during which the respective transducers are operated to read a statistically significant amount of data from the respective tracks in order to calculate one or more error rate values, such as a bit error rate (BER). Various types of errors are monitored including decoding errors associated with the servo fields 142 (e.g., SAM failures, Gray code (ID) decode failures, burst decode errors, etc.). The transducers can be maintained over a single track, or can be advanced to a succession of tracks during the scan. Error locations are decoded and logged for subsequent evaluation.

At the conclusion of the scan, the error rate test results are evaluated and the locations at which various errors occurred are revisited in turn. For each error, the associated transducer is moved adjacent the associated track, and a series of pattern profiles are obtained for each of the error locations. A cross-track scan may be performed to sweep the transducer radially across the error location, such as ±1 track, to detect whether a media defect is present at the error location and to gain further analysis data regarding the transducer as different signal levels are presented to the reader.

In addition, data are captured for the error location over a statistically significant number of revolutions, such as 25 revolutions (re-reads). A waveform plot of the output of the transducer at the error location can be generated, such as by overlaying the outputs from the transducer over the re-reads. An idealized waveform for the location can also be generated and overlaid onto the plot to evaluate and decode the error. Empirical analysis techniques can be applied to determine the error is a result of a reader instability condition, and appropriate corrective actions are thereafter taken.

The routine 200 in FIG. 5 will be described for a single transducer, although it will be appreciated that the various steps can be concurrently performed for multiple transducers as required. As shown in FIG. 5, the routine commences at step 202 where the transducer is supported adjacent a recording medium, such as the T1 transducer 124 adjacent medium 162 in FIG. 4. The transducer is supported by the fluidic currents established by rotation of the medium 162, and may be controllably adjusted using FHA (e.g., heater) or other mechanisms to a desired fly height.

The transducer is transitioned to a passive fly height mode of operation at step 204 so that the transducer supports the reader at a normal fly height induced by the air bearing surface (ABS) characteristics of a slider portion of the transducer. Each transducer may accordingly fly at a slightly different height based on the individual characteristics of the sliders. Passive fly height removes the application of heat from the transducers via the heaters or other FHA mechanisms.

A short cooling off period may be required to allow the transducer to achieve ambient temperature conditions if FHA adjustments were previously applied. Thereafter, the read test begins and the reader transduces data from one or more tracks on the medium. A number of different error rates and detection rate data metrics may be collected during the duration of the test, and the location associated with each detected error is logged.

As shown at step 206, error locations are evaluated. This can be performed for every read error identified during the test, including transducers that exhibit even a single detection error. In other cases, a predetermined threshold is selected, so that readers that have a total number of errors (or other metric) that falls within the threshold are automatically passed without additional evaluation.

A cross-track scan may be performed as noted above. This involves, for the selected transducer, positioning the transducer adjacent the track on which the error was detected. As the error location approaches the transducer, the transducer is caused to sweep radially across the error location. In some cases, the scan can be a three-track scan; for Track N, the scan can encompass Track N−1, Track N and Track N+1 (moving toward the ID or the OD of the medium as required). It is contemplated that such cross-track scans can detect media defects or other issues not related to the transducer. If such media defects are noted, the error is removed from the data, the location is marked and the data therefrom ignored during subsequent scans. It has been found, however, that some reader instability may be induced by varying the signal strength of the pattern as the transducer sweeps thereacross, so that repeated errors during the cross-track scan may be determined to be a result of a reader instability condition.

Re-reads of the error location are also carried out during step 206. A statistically significant number of re-reads, such as 25-30 re-reads, are carried out. Data associated with the readback signal from the transducer proximate the error location are captured for each pass.

As shown at step 208, the re-read readback signals are displayed in a plot overlay to evaluate the repetitive nature of the errors. If the error only occurred during one (or a few) passes, the error may be qualified as a soft error (e.g., a glitch due to some other factor than the reader). Systemic repeating of the error condition, on the other hand, signifies a hard error that is induced by the construction of the reader in combination with the particular magnetization pattern being presented to the reader. Each of the error locations for each reader is analyzed in this way. These analyses are performed by the analysis module 168 in FIG. 4. The plots may be displayed on a monitor or other interface device of the report module 170, or may be performed internally via numerical methods.

Those transducers found to have unstable readers are identified at step 210 and rejected from further manufacturing processing. Transducers found to have acceptable operational performance are cleared for installation into storage devices such as 110. Further corrective actions can be taken including failure analysis of the construction of the failed transducers, correlation of different transducers failing under similar circumstances, etc. In further embodiments, transducers that exhibit reader instability at the manufacturing device level or warranty returns from field use can be reinstalled into the system 160 to verify reader instability. As required, the calibration and/or servo patterns on the medium 162 can be updated to improve the screening capabilities of the system 160.

In some embodiments, after classifying the error as a hard error with exhibited instability at the associated location, further operational adjustments may be made to the reader. For example, activation of the FHA mechanism to adjust the fly height and apply heat to the slider body may take place, after which the same number or a different number of re-reads are carried out to determine whether the application of heat resolved or reduced the instability. These and other actions can further confirm the presence of a latent instability characteristic of the reader since it has been discovered that elevated temperature can mask some forms of latent instability. Thus, if the instability at a selected location is reduced or eliminated by the adjustment of the fly height, this may further confirm the reader is unstable.

Figure 6:
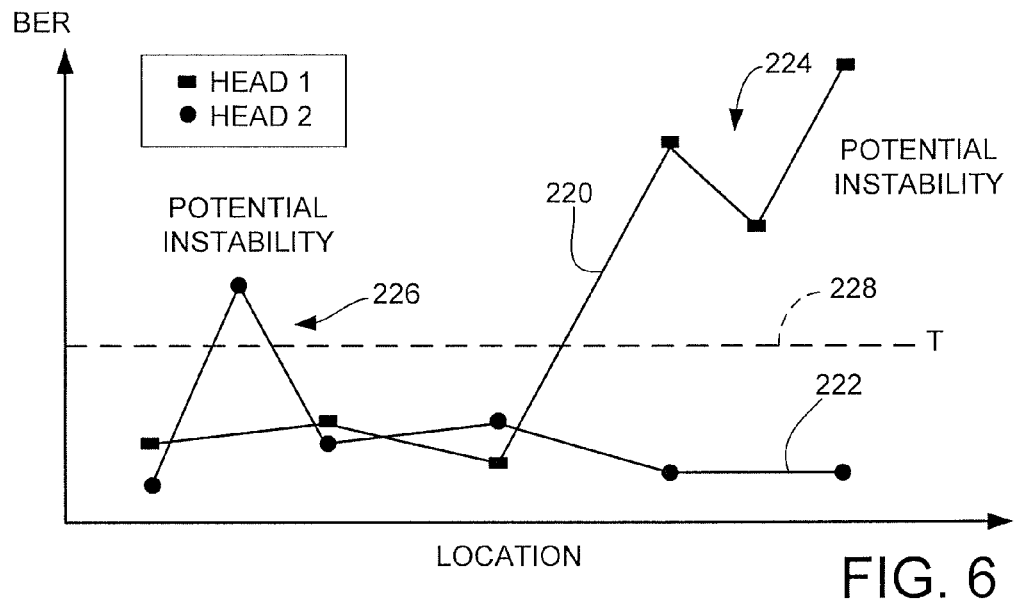
FIG. 6 is a graphical representation of test data obtained by the system of FIG. 4.

FIG. 6 is a graphical representation of exemplary bit error rate (BER) data obtained during the operation of the routine of FIG. 5 for different transducers in accordance with some embodiments. Curve 220 represents BER rates for a first transducer (head 1), and curve 222 represents BER rates for a second transducer (head 2). Each data point corresponds to a different angular location along a given data track, although other arrangements can be used. The y-axis indicates BER magnitude, with higher BER values signifying worse error rate performance (e.g., higher numbers of errors).

As can be seen, region 224 in curve 220 and region 226 in curve 222 exhibit higher than normal BER levels. These may signify potential instability on the part of the readers. In some cases, locations having BER rates greater than a predetermined threshold (T), such as indicated by broken line 228, are logged for further investigation. It will be appreciated that the BER data in FIG. 6 can be collected and analyzed in a variety of ways, such as calibration data BER, detection error BER for servo (total), detection error BER for individual servo types (e.g., ID errors, burst errors), combinations of different forms of errors, etc.

Figure 7:
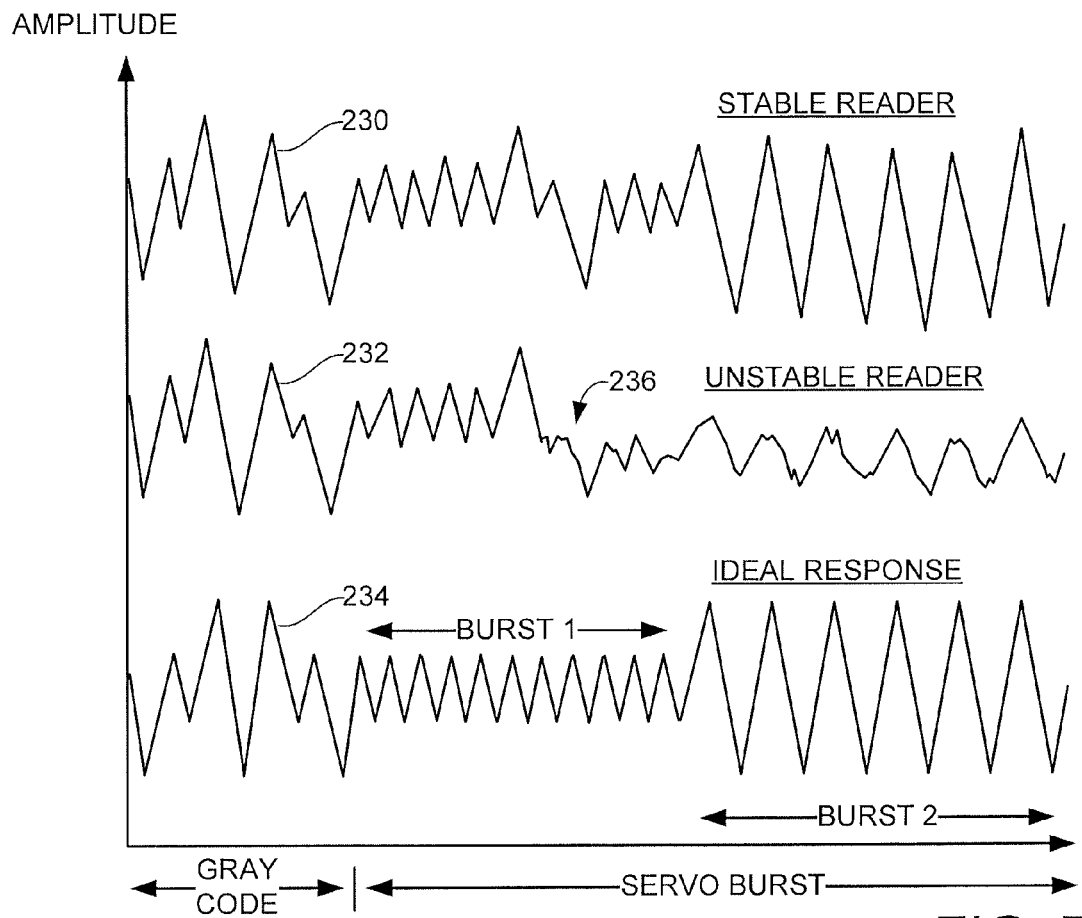
FIG. 7 is a graphical representation of further test data from the system of FIG. 4.

FIG. 7 is a graphical representation of exemplary readback signals associated with the transducers of FIG. 6. A first readback curve 230 represents a normal (stable) output from a stable reader. A second readback curve 232 represents the output from an unstable reader. A third readback curve 234 represents an ideal output based on the underlying data pattern, which constitutes a latter portion of a Gray code field and a first portion of a servo burst field (see FIG. 3). Such designations are merely exemplary and are not limiting.

The output from the stable reader (curve 230) closely follows the ideal response of curve 234. However, a reader instability commences in the vicinity of point 236 in curve 232 for the unstable reader, leading to errors in decoding the servo data. It will be appreciated that the inventors of the present disclosure have identified a number of different pattern combinations and transitions that can effectively and repeatedly induce such instabilities, including but not limited to those of the type shown in FIG. 7.

Figure 8:
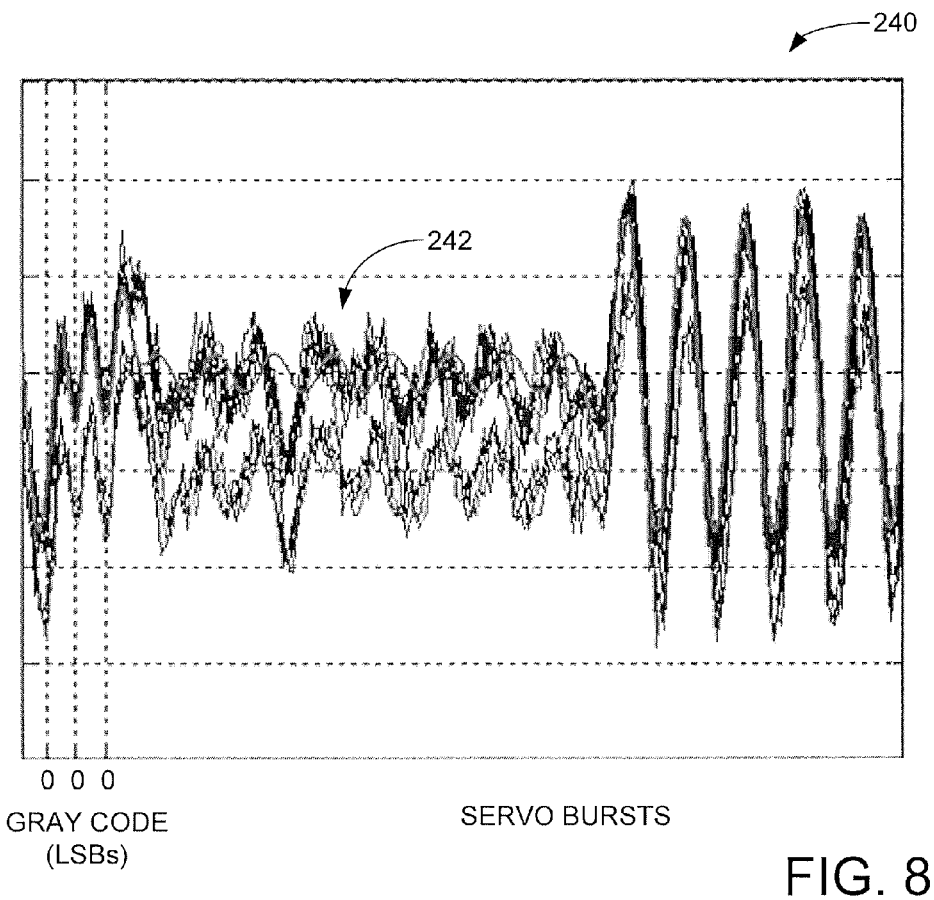
FIG. 8 is an oscilloscope plot of test data obtained using the system of FIG. 4.

FIG. 8 is a multi-trace plot of an unstable reader generally corresponding to the failure condition represented in FIG. 7. The plot represents readback signal traces 240 from a statistically significant number of passes at the error location for the unstable reader (in this case, 25 re-reads). As desired, an idealized response curve for this portion of the medium (similar to curve 234 in FIG. 7) could be overlaid onto or otherwise compared to the traces 240 for reference purposes. Averages can be computed for the respective traces and compared to the ideal trace to evaluate deviations.

It can be seen that the reader has a bi-stable, persistent state at region 242 as the reader transitions to the servo burst field, indicative of an unstable reader response. It will be noted that it in some instances the burst fields appear to trigger the instability as the reader transitions from Graycode fields to the burst fields. As a result, when the Track ID is combined with the burst information, this results in different results for each combination, illustrating an instability. Another reason instabilities may be triggered at this point is the particular magnetic orientation of the burst fields where the field abruptly changes from being down-track to being predominantly cross-track in a very short span of distance and time.

Figure 9:
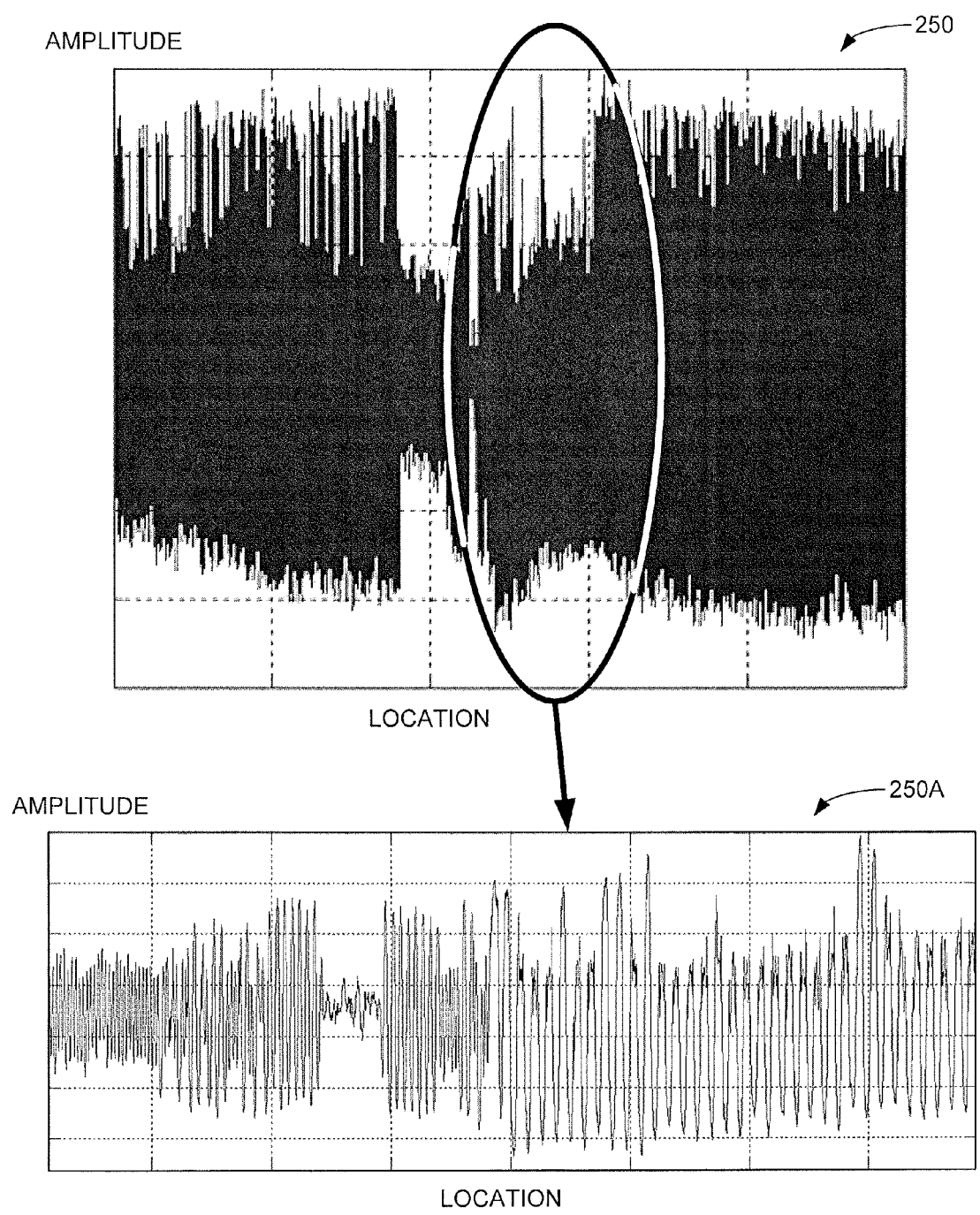
FIG. 9 provides an oscilloscope plot of test data using the system of FIG. 4.

FIG. 9 shows another readback signal trace 250 for an unstable reader obtained during the routine of FIG. 5. A portion of the trace 250 is expanded at 250A. In this case, it appears that a high amplitude pattern in a fill region separating a servo field and a data field (see FIG. 3) destabilizes the reader. The reader demonstrates stable operation over the servo field itself, including the Gray code/servo burst transition in FIG. 8.

Figure 10A:
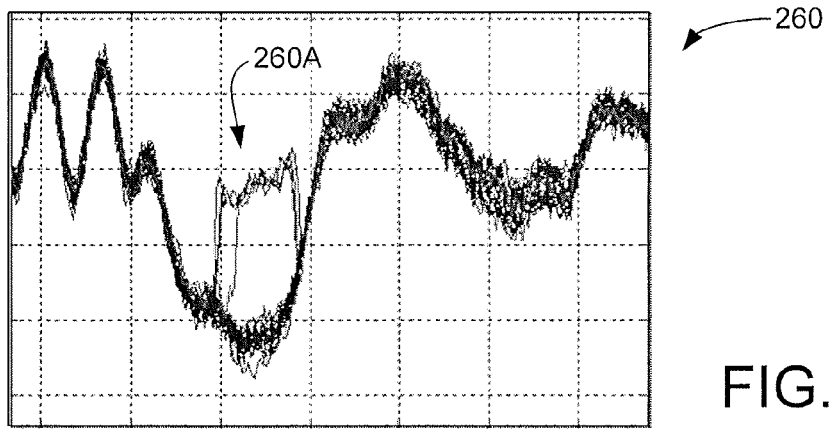
FIGS. 10A-10C provide additional oscilloscope plots of test data using the system of FIG. 4.
Figure 10B:
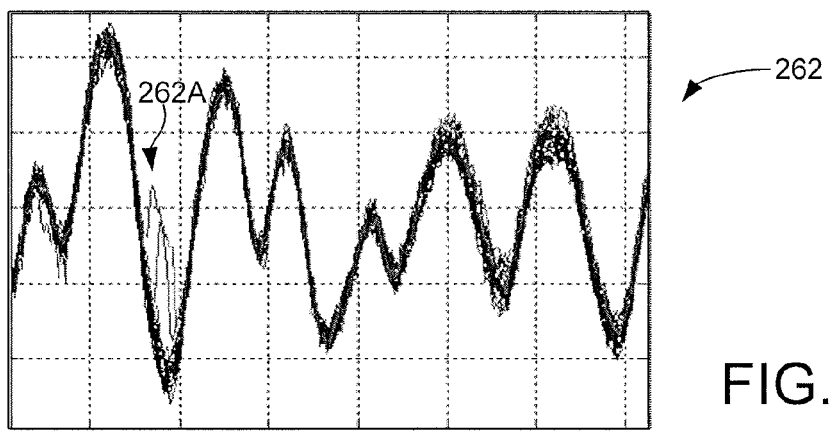
Figure 10C:
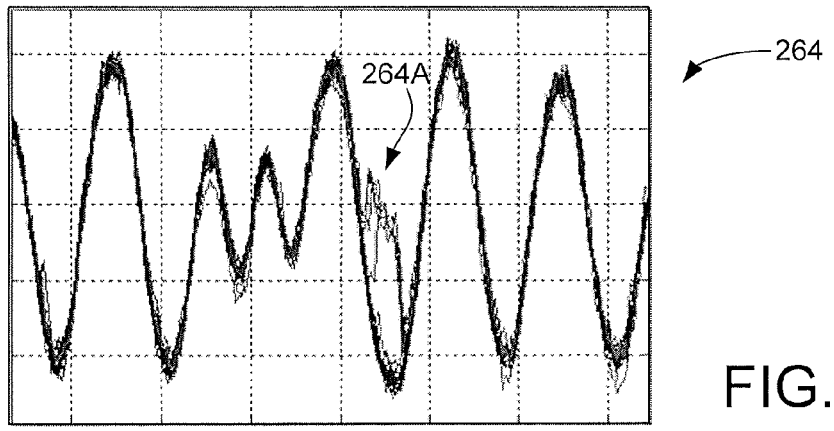

FIGS. 10A-10C illustrate additional reader responses 260, 262 and 264 to demonstrate failing bit errors during the routine of FIG. 5. Both stable and unstable reader responses are represented in each plot. For reference, the plots are all taken from the same reader and demonstrate the transient nature of instability in that it can appear and be resolved over the same pattern region. The stable reader responses follow the substantially sinusoidal path in each plot. Unstable reader responses are exhibited by failed bit responses at 260A, 262A and 264A, respectively. In this case, it can be seen that unstable readers tend to glitch at different bit locations within the data pattern, but only under certain pattern conditions. Other combinations of patterns have been found to induce reader instabilities, so that the foregoing are merely examples and are not limiting. Empirical analysis can be used to tailor and tune the test patterns based on history data, so that the test system can be adaptively improved over time to detect a greater percentage of the latent instability defects.

Figure 11:
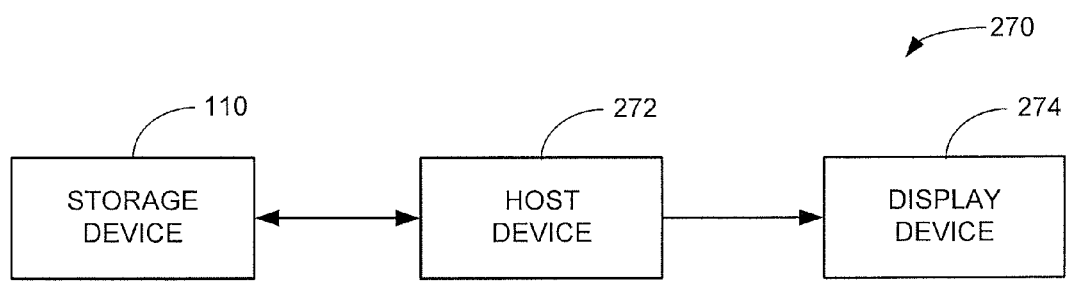
FIG. 11 is a functional block representation of another test system adapted to carry out the routine of FIG. 5 in accordance with some embodiments.

While the foregoing testing and analysis has been described at a component level during manufacturing (ET) testing, such is merely exemplary and is not limiting. In another embodiment, a test system 270 in FIG. 11 can carry out the foregoing analysis at a storage device level. More particularly, the storage device 110 from FIG. 2 can be coupled to a host device 272, such as a specially configured computer or other device. The system 270 can represent manufacturing device level testing and/or an end user field environment.

The storage device 110 includes specially configured diagnostic routines that, when accessed under proper authentication credentials supplied by the host device 272, can proceed to carry out scans as described above. The scans can be to specially configured calibration tracks for each transducer, or can be upon areas that store user data. In some cases, the scans can be performed on locations at which reader instability type errors have been detected.

As required, readback signals such as represented above can be forwarded from the storage device 110 to the host device 272, which in turn provides plot displays on a display device 274 such as a monitor. In this way, in situ field analysis in the existing environment can be carried out to evaluate the presence of reader instabilities.

It has been found that using prewritten servo patterns and data patterns in the manner described herein can repeatedly and reliably induce reader instabilities in marginal readers. The instabilities can be located over servo bursts or other servo fields, and over the media certification fill data patterns. By evaluating reader performance at the component level, unstable readers can be identified and screened prior to device level manufacturing. Alternatively or additionally, the various routines can be carried out at the manufactured device level, including during manufacturing testing and subsequent end user field use.

At the component level, precertified, prewritten media can be generated by multi-disc writers (MDW) or self written by the transducers, including data used during other portions of the component test. Manufacturing failures and warranty return failures can be evaluated to determine whether the failures were due to instability, and changes to the test patterns can be made to screen for such defects in future test runs.

While in some cases the plots may be used to enable test personnel to manually make individual judgments with regard to whether a particular reader is an unstable reader, it is contemplated that the process can be automated. For example, the controller can apply analysis threshold techniques in evaluating the readback signal plot data during the rereads of the various locations associated with error conditions obtained during the initial scan. Empirical data can be used to adaptively adjust the automated evaluation process.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   supporting a transducer adjacent a rotating data recording medium having servo data patterns interspersed with calibration test data patterns, the transducer comprising a read sensor and a fly height adjustment (FHA) mechanism, the FHA mechanism operative, when activated, to adjust a fly height of the transducer relative to the medium;
   using the read sensor of the transducer to read the servo data patterns and the calibration test data patterns while maintaining the transducer at a passive fly height adjacent the medium achieved by placing the FHA mechanism in a deactivated state;
   identifying a location on the surface at which an error is detected during said reading; and
   rereading at least a selected one of the servo data patterns and the calibration test data patterns at the location to characterize the read sensor as an unstable reader.

2. The method of claim 1, wherein the at least the selected one of the servo data patterns and the calibration test data patterns are reread while maintaining the transducer at the passive fly height, and the read sensor is characterized as an unstable reader responsive to readback signals obtained during said rereading of the servo data patterns and the calibration test data patterns at the location.

3. The method of claim 2, wherein the servo data patterns and the calibration test data patterns are further reread while maintaining the transducer at a different, active fly height established by activation of a fly height adjustment (FHA) mechanism of the transducer to generate a second set of readback signals, and the read sensor is further characterized as an unstable reader responsive to the second set of readback signals.

4. The method of claim 1, wherein the read sensor rereads the servo data patterns and the calibration test data patterns at the location a plural number of times to generate a corresponding plurality of readback signals, and the method further comprises analyzing repeatability of aligned readback signals to characterize the read sensor as an unstable reader responsive to persistent deviations in the aligned readback signals from an ideal response of the readback signals.

5. The method of claim 1, wherein the location comprises a circumferential track having an overall radial width, and the read sensor rereads the servo data patterns and the calibration test data patterns at the location by performing a cross-track scan to advance the transducer in a radial direction across the overall radial width of the track.

6. The method of claim 1, wherein the data recording medium comprises a rotatable perpendicular magnetic recording medium and the transducer further comprises a write element configured to write data to the medium.

7. The method of claim 1, wherein the FHA mechanism comprises a heater which, when activated, transfers heat to a body portion of the transducer to lower the fly height through thermal expansion of the body portion.

8. The method of claim 1, wherein the method further comprises supporting the transducer while the FHA mechanism is in an activated state, deactivating the FHA mechanism, and initiating a delay over a predetermined cooling period to enable the transducer to achieve an ambient temperature prior to reading the servo data patterns and the calibration test data patterns while maintaining the transducer at the passive fly height.

9. The method of claim 1, wherein the servo patterns are pre-written servo patterns written to the medium, and the method subsequently comprises using the pre-written servo patterns to position a transducer to write user data to the medium.

10. The method of claim 1, wherein the servo patterns comprise a Gray code field followed by a burst pattern, and reader instability is detected responsive to a persistent response of the transducer as the reader transitions from reading the Gray code field to reading the burst pattern.

11. An apparatus comprising:
a rotatable data recording medium having servo data patterns interspersed with calibration test data patterns;
a transducer supported adjacent the medium having a read sensor and a fly height adjustment (FHA) mechanism;
a data channel which processes readback signals from the read sensor as the read sensor reads the servo data patterns and calibration test data patterns at a passive fly height during which the FHA mechanism is in a deactivated state;
a control circuit which directs the transducer to reread a location on the medium associated with an error condition in the processed readback signals a plural number of times in succession to characterize the error condition as due to instability in the response of the read sensor.

12. The apparatus of claim 11, wherein the read sensor is a magneto-resistive (MR) sensor.

13. The apparatus of claim 11, wherein the FHA mechanism is a heater which adjusts the fly height of the transducer during activation thereof through thermal expansion of a body portion of the transducer.

14. The apparatus of claim 11, characterized as a component-level electrical test (ET) stand adapted to concurrently test a plurality of transducers nominally identical to the transducer adjacent the medium.

15. The apparatus of claim 11, characterized as a data storage device.

16. The apparatus of claim 11, wherein the read sensor rereads the servo data patterns and the calibration test data patterns at the location a plural number of times to generate a corresponding plurality of reread readback signals, and the control circuit comprises a display device which displays plots of the reread readback signals in an overlying fashion to facilitate characterization the read sensor as an unstable reader responsive to persistent deviations in the plots of the reread readback signals from an ideal plot of the reread readback signals.

17. The apparatus of claim 11, wherein the transducer further comprises a write element which writes the calibration test data patterns to the medium.

18. The apparatus of claim 11, wherein the location comprises a circumferential track having an overall radial width, and the control circuit directs the read sensor to reread the servo data patterns and the calibration test data patterns at the location by performing a cross-track scan to advance the transducer in a radial direction across the overall radial width of the track.

19. An electrical test (ET) system, comprising:
a rotatable data recording medium having servo data patterns interspersed with calibration test data patterns;
a plurality of nominally identical transducers each mounted adjacent the medium and having a read sensor and a fly height adjustment (FHA) mechanism;
a corresponding plurality of data channel circuits coupled to the transducers each adapted to concurrently process readback signals from the associated read sensor of the associated transducer as the read sensor reads selected servo data patterns and calibration test data patterns from the medium and the associated transducer is supported at a passive fly height during which the FHA mechanism of the associated transducer is in a deactivated state;
a controller operative to collect error rate data during an initial scan from each of the transducers, the controller further operative to, for each location on the medium associated with an error condition determined from the error rate data, direct the associated transducer to reread the associated location on the medium a plurality of times and to characterize the associated transducer as an unstable reader responsive to the rereading of the associated location.

20. The ET system of claim 19, further comprising a display device which generates an overlay of readback signal plots obtained from the rereading of the associated location and an ideal readback signal plot indicative of an ideal response from a stable reader.

* * * * *